(12) United States Patent
Ikemoto

(10) Patent No.: US 9,841,580 B2
(45) Date of Patent: Dec. 12, 2017

(54) DISTANCE MEASURING APPARATUS

(71) Applicant: CANON KABUSHIKI KAISHA, Tokyo (JP)

(72) Inventor: Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 273 days.

(21) Appl. No.: 14/441,820

(22) PCT Filed: Oct. 21, 2013

(86) PCT No.: PCT/JP2013/079060
§ 371 (c)(1),
(2) Date: May 8, 2015

(87) PCT Pub. No.: WO2014/073401
PCT Pub. Date: May 15, 2014

(65) Prior Publication Data
US 2015/0286031 A1      Oct. 8, 2015

(30) Foreign Application Priority Data
Nov. 12, 2012   (JP) .................................. 2012-248624

(51) Int. Cl.
*G02B 7/28*  (2006.01)
*G01C 3/08*  (2006.01)
*G02B 7/34*  (2006.01)
*G01C 3/14*  (2006.01)

(52) U.S. Cl.
CPC ............... *G02B 7/287* (2013.01); *G01C 3/08* (2013.01); *G01C 3/14* (2013.01); *G02B 7/34* (2013.01)

(58) Field of Classification Search
CPC . G02B 7/287; G02B 7/34; G01C 3/14; G03B 3/00; G03B 3/10; G03B 15/05
USPC ........................................................ 348/187
See application file for complete search history.

(56) References Cited

U.S. PATENT DOCUMENTS

| 4,914,282 A | 4/1990 | Akashi et al. |
| 8,159,599 B2 | 4/2012 | Takamiya |
| 2002/0039489 A1* | 4/2002 | Matsuda ................... G03B 3/00 396/91 |

(Continued)

FOREIGN PATENT DOCUMENTS

JP      2002-314062 A     10/2002

*Primary Examiner* — Tung Vo
(74) *Attorney, Agent, or Firm* — Canon U.S.A., Inc. IP Division

(57) ABSTRACT

The present invention relates to a distance measuring apparatus including an imaging device and a calculation unit calculating a distance to a subject on the basis of an electrical signal. The imaging device includes a signal acquisition unit that acquires a first electrical signal based on a beam that has passed through a first region off the center of the exit pupil in a predetermined direction; a second electrical signal based on a beam that has passed through a second region off the center of the exit pupil in a direction opposite to the predetermined direction; and a third electrical signal based on a beam that has passed through a region eccentric from the first region in the direction opposite to the predetermined direction. The calculation unit performs a signal correction process for generating a first corrected signal and a distance calculation process for calculating the distance.

19 Claims, 10 Drawing Sheets

(56) References Cited

U.S. PATENT DOCUMENTS

| | | | |
|---|---|---|---|
| 2010/0045849 A1* | 2/2010 | Yamasaki | G03B 3/10 348/349 |
| 2010/0157094 A1 | 6/2010 | Takamiya | |
| 2010/0289929 A1* | 11/2010 | Ohwa | G03B 15/05 348/241 |
| 2011/0096171 A1 | 4/2011 | Kimura | |
| 2013/0016274 A1* | 1/2013 | Matsuo | H04N 5/3696 348/345 |

* cited by examiner

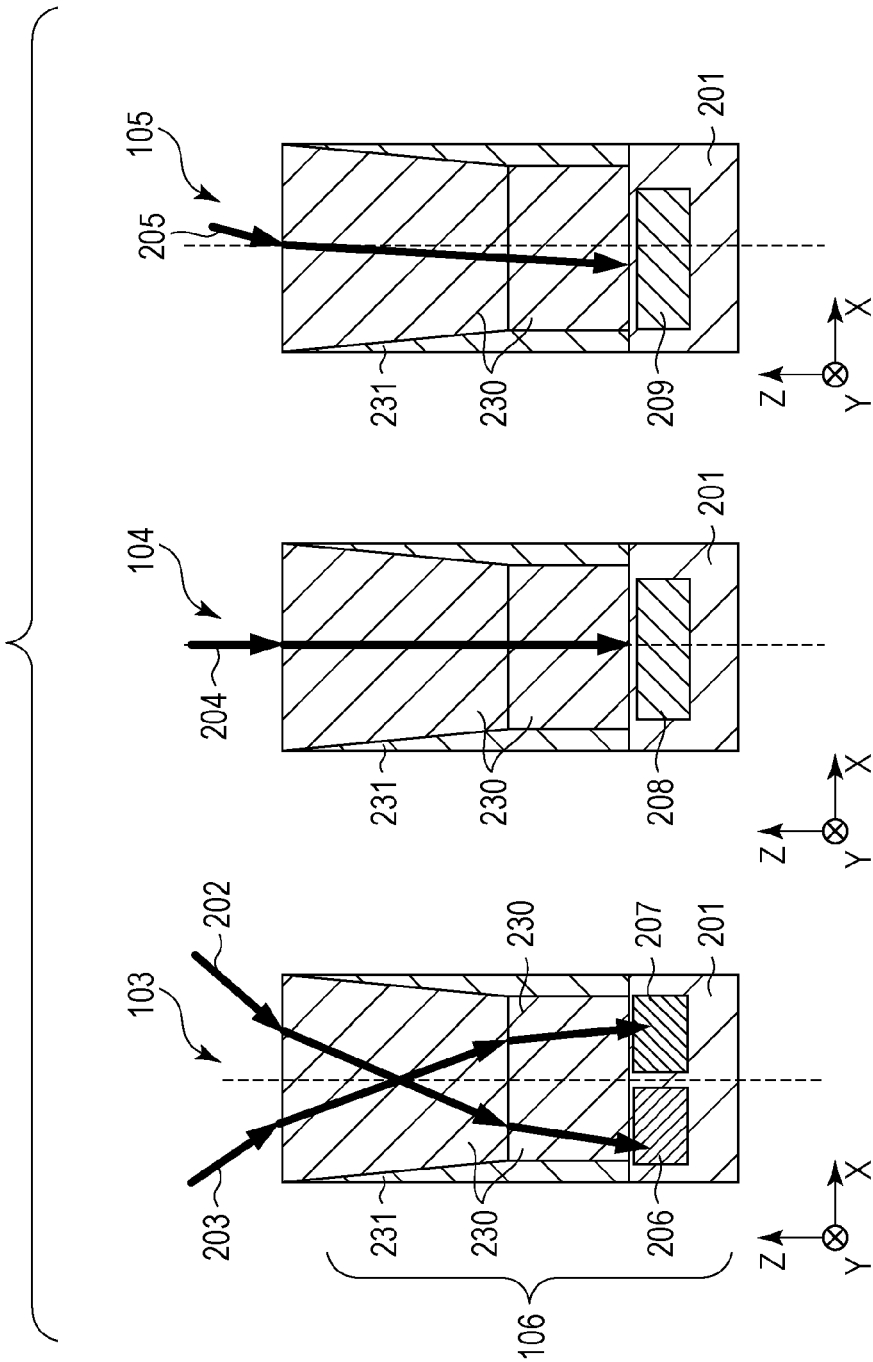

DISTANCE MEASURING APPARATUS

TECHNICAL FIELD

The present invention relates to a distance measuring apparatus, and in particularly, to a distance measuring apparatus for use in a digital still camera, a digital video camera, and so on.

BACKGROUND ART

A phase-contrast distance measuring technique is known as a distance measuring technique applicable to digital still cameras and video cameras.

PTL 1 discloses a solid-state imaging device in which some of pixels have a ranging function using a phase contrast method. The individual pixels have light receiving portions each including a microlens and a photoelectric conversion section. The light receiving portions have the characteristic of having sensitivity to a beam that is incident thereon at a small angle range through the microlens by guiding light incident at a specific angle to the photoelectric conversion sections. With this configuration, beams that have passed through partial regions on the pupil of the image-forming optical system are detected. Two images generated from the beams that have passed through different regions on the pupil of the camera lens are acquired by different light receiving portions. The distance between the two images is estimated, and the defocusing amount is calculated by triangulation using a stereo image to perform ranging.

This method does not need to move the lens to measure the range, in contrast to the conventional contrast method, thus allowing high-speed high-accuracy ranging.

The signals acquired by the light receiving portions of the pixels can be used as imaging signals for generating an image, thus allowing imaging and ranging at the same time.

PTL 2 discloses a focus detection apparatus equipped with an imaging device having a pair of pixel groups that receive beams that have passed through different pupil regions of an image-capturing optical system and output a first image signal and a second image signal, respectively.

The focus detection apparatus includes a calculation unit that subtracts a value obtained by multiplying a second image signal by a second factor from a value obtained by multiplying a first image signal by a first factor to generate a first correct image signal and that subtracts a value obtained by multiplying a first image signal by a fourth factor from a value obtained by multiplying a second image signal by a third factor to generate a second correct image signal; and a focus detection unit that determines the defocusing amount on the basis of the phase difference between the first and second correct image signals.

CITATION LIST

Patent Literature

PTL 1 Japanese Patent Laid-Open No. 2002-314062 PTL 2 U.S. Pat. No. 8,159,599

SUMMARY OF INVENTION

Technical Problem

With the configuration disclosed in PTL 1, the light receiving portions are low-sensitivity light receiving portions having sensitivity only to beams that enter in a relatively narrow angle range. Ranging a low-luminance subject with such light receiving portions causes low signal intensity and an insufficient S/N ratio, thus making it difficult to achieve high-accuracy ranging.

In contrast, using high-sensitivity light receiving portions having sensitivity to beams that enter in a wide angle range increases the signal intensity and improves the S/N ratio of the signals. These light receiving portions detect beams that have passed through a wide region of the pupil. This makes pupil division indefinite and the base length short, thus making it difficult to achieve high-accuracy ranging.

The configuration disclosed in PTL 2 may have room for improvement in focusing accuracy for a low-luminance subject, although the configuration increases the focusing accuracy with a simple calculation.

In consideration of the above problem, the present invention provides a distance measuring apparatus capable of measuring a distance to a low-luminance subject with high accuracy by using high-sensitivity light receiving portions that causes indefinite pupil division.

Solution to Problem

A distance measuring apparatus according to an aspect of the present invention includes an optical system forming an image of a subject; an imaging device acquiring an electrical signal from a beam that has passed through an exit pupil of the optical system; and a calculation unit calculating a distance to the subject on the basis of the electrical signal. The imaging device includes a signal acquisition unit that acquires, on a plurality of locations on the imaging device, a first electrical signal mainly based on a beam that has passed through a first region off the center of the exit pupil in a predetermined direction, a second electrical signal mainly based on a beam that has passed through a second region off the center of the exit pupil in a direction opposite to the predetermined direction, and a third electrical signal different from the second electrical signal on the basis of a beam that has passed through a region eccentric from the first region in the direction opposite to the predetermined direction. The calculation unit performs a signal correction process for generating a first corrected signal by subtracting the third electrical signal from the first electrical signal in a predetermined proportion and a distance calculation process for calculating the distance by using the first corrected signal.

Further features of the present invention will become apparent from the following description of exemplary embodiments with reference to the attached drawings.

Advantageous Effects of Invention

According to an embodiment of the present invention, a distance measuring apparatus capable of measuring a distance to a low-luminance subject with high accuracy can be achieved.

BRIEF DESCRIPTION OF DRAWINGS

FIG. 8 is a cross-sectional view showing, in outline, an imaging device of the distance measuring apparatus according to the first embodiment of the present invention;

DESCRIPTION OF EMBODIMENTS

Basic Configuration

Referring to FIGS. 1A to 1C and FIGS. 2A and 2B, a distance measuring apparatus 100 according to an embodiment of the present invention will be described.

The distance measuring apparatus 100 according to an embodiment of the present invention includes an optical system 101 that forms an image of a subject, an imaging device 102 that acquires an electrical signal by using a beam that has passed through an exit pupil of the optical system 101, and a calculation unit that calculates a distance to the subject on the basis of the electrical signal.

Figure 1A:
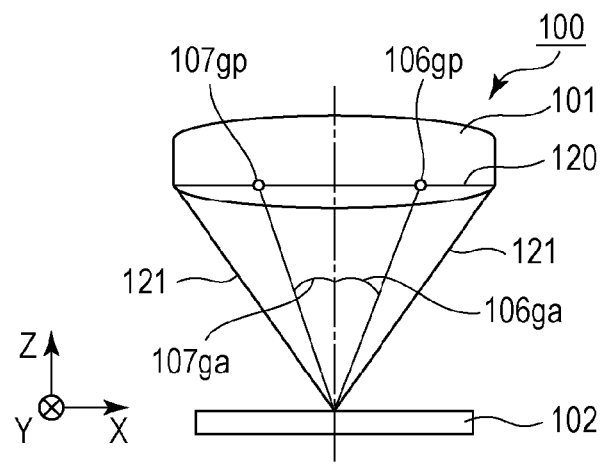
FIG. 1A is a cross-sectional view showing, in outline, a distance measuring apparatus according to an embodiment of the present invention.
Figure 1B:
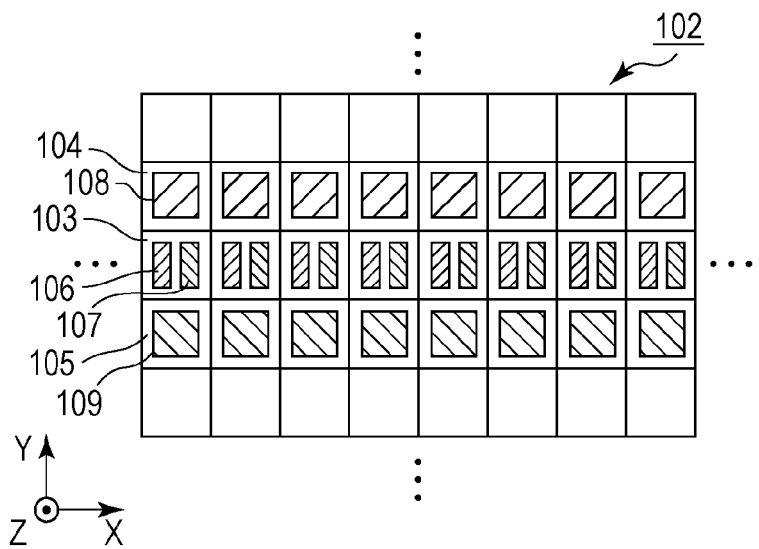
FIG. 1B is a schematic diagram illustrating an example of an imaging device.
Figure 1C:
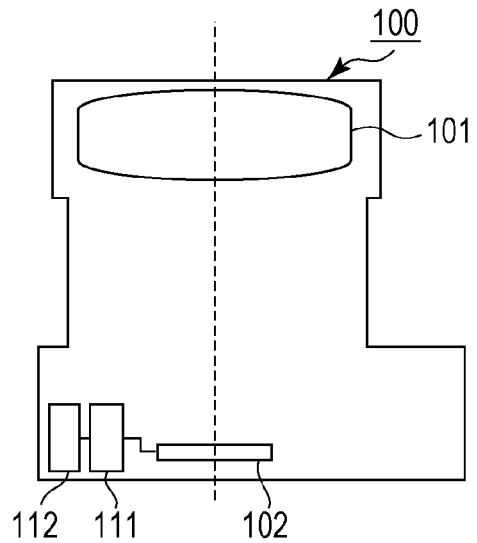
FIG. 1C is a schematic diagram illustrating an example of the overall configuration of the distance measuring apparatus.

FIG. 1A is a schematic diagram that mainly illustrates the image-forming optical system 101 and the imaging device 102 constituting the distance measuring apparatus 100 according to an embodiment of the present invention. FIG. 1B is a schematic diagram illustrating an example of the imaging device 102. FIG. 1C is a schematic diagram illustrating an example of the overall configuration of the distance measuring apparatus 100 according to an embodiment of the present invention.

As shown in FIG. 1A, the image-forming optical system 101 forms an image of an external subject on the surface of the imaging device 102.

As shown in FIG. 1B, the imaging device 102 includes a plurality of pixels 103, 104, 105, . . . . The pixel 103 includes light receiving portions 106 and 107, the pixel 104 includes a light receiving portion 108, and the pixel 105 includes a light receiving portion 109 serving as signal acquisition units for acquiring ranging and correcting electrical signals. The pixels 103, 104, and 105 each include a reading unit (not shown) that converts electrical charge accumulated in each of the light receiving portions 106 to 109 to electrical signals and outputs the electrical signals to a distance calculation unit 111. The reading unit is constituted by, for example, a floating diffusion portion, a gate electrode, and wires.

As shown in FIG. 1C, the distance measuring apparatus 100 includes the distance calculation unit 111 for calculating a distance to the subject by using the acquired signals, in addition to the optical system 101 and the imaging device 102. The distance calculation unit 111 is constituted by a signal processing substrate including, for example, a CPU and a memory. The distance measuring apparatus 100 may have a recording unit 112 for recording read signals or calculation results. FIG. 1C illustrates the distance measuring apparatus 100; alternatively, it may be a digital camera including a driving mechanism for focusing of the optical system 101, a shutter, and a display, such as a liquid crystal display, for checking images.

The imaging device 102 that constitutes the distance measuring apparatus 100 of an embodiment of the present invention includes a signal acquisition unit that acquires, on a plurality of locations on the imaging device, a first electrical signal mainly based on a beam that has passed through a first region off the center of the exit pupil in a predetermined direction, a second electrical signal mainly based on a beam that has passed through a second region off the center of the exit pupil in a direction opposite to the predetermined direction, and a third electrical signal different from the second electrical signal on the basis of a beam that has passed through a region eccentric from the first region in the direction opposite to the predetermined direction.

The calculation unit 111 performs a signal correction process for generating a first corrected signal by subtracting the third electrical signal from the first electrical signal in a predetermined proportion and a distance calculation process for calculating the distance by using the first corrected signal.

These features will be described in detail later.

Definition of Center of Gravitation Angle, Center of Gravity of Pupil, and, Pupil Divided Region In an embodiment of the present invention, the distance between the image-forming optical system 101 and the imaging device 102 is larger than the size of each pixel. This causes beams that have passed through different positions on an exit pupil 120 of the image-forming optical system 101 to be incident on the surface of the imaging device 102 at different incident angles.

The light receiving portions 106 and 107 receive beams from a predetermined angle range 121 depending on the shape of the exit pupil 120 and the positions of the light receiving portions 106 and 107 on the imaging device 102. The sensitivity characteristics of the light receiving portions 106 and 107 to the beams incident at different angles are referred to as angle characteristics.

An angle that is the center of gravity of the sensitivity of a light receiving portion in the angle range of a beam incident on the light receiving portion is referred to as a center-of-gravity angle. The center-of-gravity angle can be calculated by using Exp. 1.

In Exp. 1, θ is an angle that a pupil dividing direction (in this embodiment, the x-axis direction) forms with the z-axis in a plane including the z-axis, θg is the center-of-gravity angle, t(θ) is the sensitivity of the light receiving portion, and integration is performed on the angle range of beams incident on the light receiving portion.

[Math. 1]
$$\theta g = \frac{\int \sin(\theta) \cdot t(\theta) d\theta}{\int t(\theta) d\theta} \quad \text{(Exp. 1)}$$

A position on the exit pupil 120 through which a beam incident on the light receiving portion at a center-of-gravity angle θg is referred to as the center of gravity of the pupil. A region on the exit pupil 120 which includes the center of gravity of the pupil and through which a beam incident from an angle range in which the sensitivity of the light receiving portion is high is referred to as a pupil divided region.

Figure 2A:
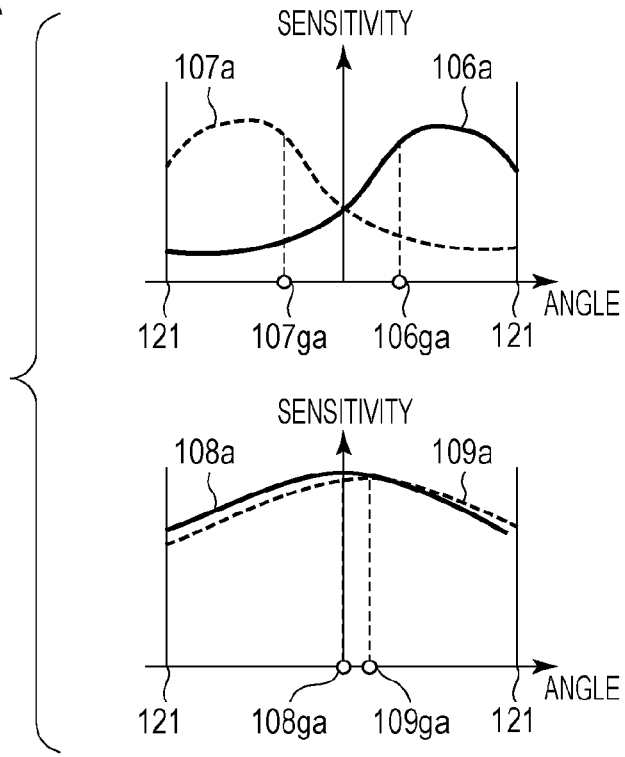
FIG. 2A is a graph showing the characteristics of the distance measuring apparatus.

FIG. 2A shows the angle characteristics of the individual light receiving portions 106 to 109 to beams incident at different angles in the x-z plane, in which the horizontal axis indicates an angle that an incident beam forms with the x-axis in the x-z plane, and the vertical axis indicates the sensitivity. Reference signs 106ga, 107ga, 108ga, and 109ga denote the center-of-gravity angles of the light receiving portions 106, 107, 108, and 109, respectively.

Figure 2B:
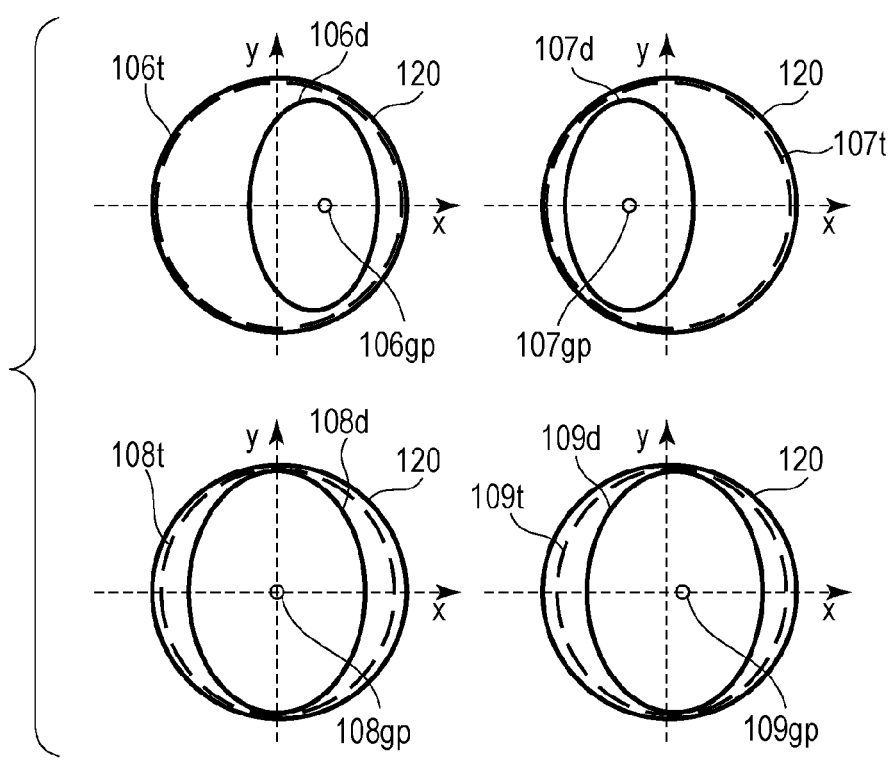
FIG. 2B is a diagram of an exit pupil according to an embodiment of the present invention.

Broken lines denoted by reference signs 106t, 107t, 108t, and 109t in FIG. 2B indicate regions through which the beams received by the light receiving portions 106, 107, 108, and 109, pass through, respectively. Reference signs 106d, 107d, 108d, and 109d denote the pupil divided regions of the light receiving portions 106, 107, 108, and 109, respectively. Reference signs 106gp, 107gp, 108gp, and 109gp denote the centers of gravity of the pupils of the light receiving portions 106, 107, 108, and 109, respectively.

The light receiving portions 106 and 107 are configured to have sensitivity to beams incident on the light receiving portions 106 and 107 in a wide angle range and to receive beams that have passed through the substantially whole regions 106t and 107t of the exit pupil 120.

The light receiving portion 106 is configured such that the pupil divided region 106d is off the center of the exit pupil 120 in the +x direction. In other words, the light receiving portion 106 mainly receives a beam that has passed through a first region off the center of the exit pupil 120 in a predetermined direction. The light receiving portion 106 acquires a first electrical signal on the basis of the beam. Thus, the light receiving portion 106 constitutes a signal acquisition unit. The light receiving portion 106 can be referred to as a first light receiving portion.

The light receiving portion 107 is configured such that the pupil divided region 107d is off-centered in the −x direction opposite to the pupil divided region 106d. In other words, the light receiving portion 107 mainly receives a beam that has passed through a second region off the center of the exit pupil 120 in the direction opposite to the predetermined direction. The light receiving portion 107 acquires a second electrical signal on the basis of the beam. Thus, the light receiving portion 107 constitutes a signal acquisition unit. The light receiving portion 107 can be referred to as a second light receiving portion.

A direction in which the pupil divided regions 106d and 107d are connected is referred to as a pupil dividing direction (in this embodiment, the x-direction). The light receiving portions 106 and 107 are disposed at a plurality of locations in the pupil dividing direction on the imaging device 102. The light receiving portions 106 and 107 can receive beams that have passed through different pupil regions at the plurality of locations in the pupil dividing direction. Signals acquired by the light receiving portions 106 and 107 can be used as ranging signals or image signals.

The light receiving portion 108 is configured such that it has sensitivity to a beam that has passed through the pupil region 108t in the pupil region 106t and that the pupil divided region 108d is eccentric from the pupil divided region 106d to the −x direction (the direction opposite to the eccentric direction of the pupil divided region 106d). In other words, the light receiving portion 108 acquires a third electrical signal different from the second electrical signal mainly on the basis of a beam that has passed through a region eccentric from the first region to the direction opposite to the predetermined direction. Thus, the light receiving portion 108 constitutes a signal acquisition unit. The light receiving portion 108 can be referred to as a third light receiving portion.

The light receiving portion 109 is configured such that it has sensitivity to a beam that has passed through the pupil region 109t in the pupil region 107t and that the pupil divided region 109d is eccentric from the pupil divided region 107d to the +x direction (the direction opposite to the eccentric direction of the pupil divided region 107d). In other words, the light receiving portion 109 acquires a fourth electrical signal different from the first electrical signal mainly on the basis of the beam that has passed through a region eccentric from the second region in the predetermined direction. Thus, the light receiving portion 109 constitutes a signal acquisition unit. The light receiving portion 109 can be referred to as a fourth light receiving portion.

The light receiving portions 108 and 109 are disposed at a plurality of locations in the pupil dividing direction on the imaging device 102 and in the vicinity of the light receiving portions 106 and 107, respectively.

The signals acquired by the light receiving portions 106 to 109 can be used as correcting signals. The light receiving portion 108 is configured to receive beams more than the light receiving portion 107, and the light receiving portion 109 is configured to receive beams more than the light receiving portion 106 so that they have high sensitivity. Thus, the light receiving portions 106 to 108 can acquire correcting signals having a higher signal-to-noise (S/N) ratio than that of the ranging signals.

The signals acquired at the plurality of locations by the light receiving portions 106 to 108 are referred to as signals $S_{106}$, $S_{107}$, $S_{108}$, and $S_{109}$.

Figure 3:
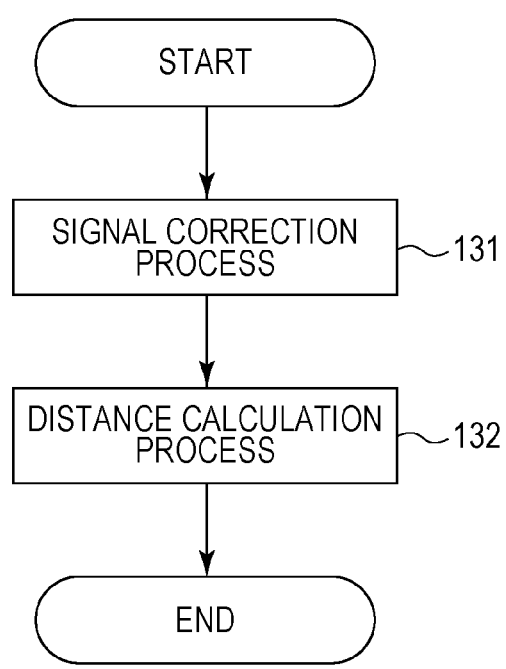
FIG. 3 is a flowchart for the distance measuring apparatus according to an embodiment of the present invention.

The distance calculation unit 111 calculates the distance to the subject in accordance with the flowchart shown in FIG. 3.

Step 131 is a signal correction process, in which a corrected signal $CS_{106}$ is generated by subtracting the signal $S_{108}$ from the signal $S_{106}$ at individual locations on the imaging device 102 in a predetermined proportion, as expressed as Exp. 2. In other words, the third electrical signal is subtracted from the first electrical signal in a predetermined proportion to generate a first corrected signal.

As expressed by Exp. 4, a corrected signal $CS_{107}$ is generated by subtracting the signal $S_{109}$ from the signal $S_{107}$ in a predetermined proportion at individual locations on the imaging device 102. In other words, the fourth electrical signal is subtracted from the second electrical signal in a predetermined proportion to generate a second corrected signal.

In Exp. 2 and Exp. 4, α and β are correction factors, which are real numbers larger than 0. Such a signal correction process is performed at a plurality of locations in the pupil dividing direction on the imaging device 120 to generate the corrected signals $CS_{106}$ and $CS_{107}$.

$$CS_{106} = S_{106} - \alpha \cdot S_{108} \quad \text{(Exp. 2)}$$

This can be simply expressed as Exp. 3.

$$S_1' = S_1 - \alpha S_3 \quad \text{(Exp. 3)}$$

where $S_1'$ is the first corrected signal, $S_1$ and $S_3$ are the first and third electrical signals, and α is a correction factor.

$$CS_{107} = S_{107} - \beta \cdot S_{109} \quad \text{(Exp. 4)}$$

This can be simply expressed as Exp. 5.

$$S_2' = S_2 - \beta S_4 \quad \text{(Exp. 5)}$$

where $S_2'$ is the second corrected signal, $S_2$ and $S_4$ are the second and fourth electrical signals, and β is a correction factor.

In step 132, the distance to the subject is calculated from the corrected signal $CS_{106}$ (first corrected signal) and corrected signal $CS_{107}$ (second corrected signal) pair. This includes a distance calculation process for calculating the distance by using the first corrected signal $S_1'$.

The gap length of the signal pair can be calculated using a known method. For example, the gap length can be obtained by calculating the correlation while shifting one of the signal pair to find a gap length at the highest correlation. Furthermore, a defocusing amount is obtained from the thus-acquired gap length by a known method to determine the distance to the subject.

Using the distance measuring apparatus 100 equipped with the light receiving portions 106 to 109 and the calculation unit described above allows the distance to a low-luminance subject to be measured with high accuracy.

Principle

The reason that high-accuracy ranging can be achieved by the distance measuring apparatus 100 of an embodiment of the present invention will be described.

The defocusing amount (distance) can be calculated from the gap length of the signal pair.

A gap length at a given defocusing amount depends on the base length. The base length depends on the distance between the centers of gravity of the pupils of light receiving portions that generate a signal pair.

The gap length increases as the distance between the centers of gravity of the pupils (base length) increases. This allows the gap length to be determined with high accuracy, thus enabling high-accuracy ranging.

In the signal correction process of step 131, the corrected signal $CS_{106}$ (first corrected signal) corresponds to a signal acquired by an imaginary light receiving portion having an angle characteristic 106a' that is obtained by subtracting the angle characteristic 108a×α from the angle characteristic 106a. This also applies to the corrected signal $CS_{107}$ (second corrected signal).

Figure 4:
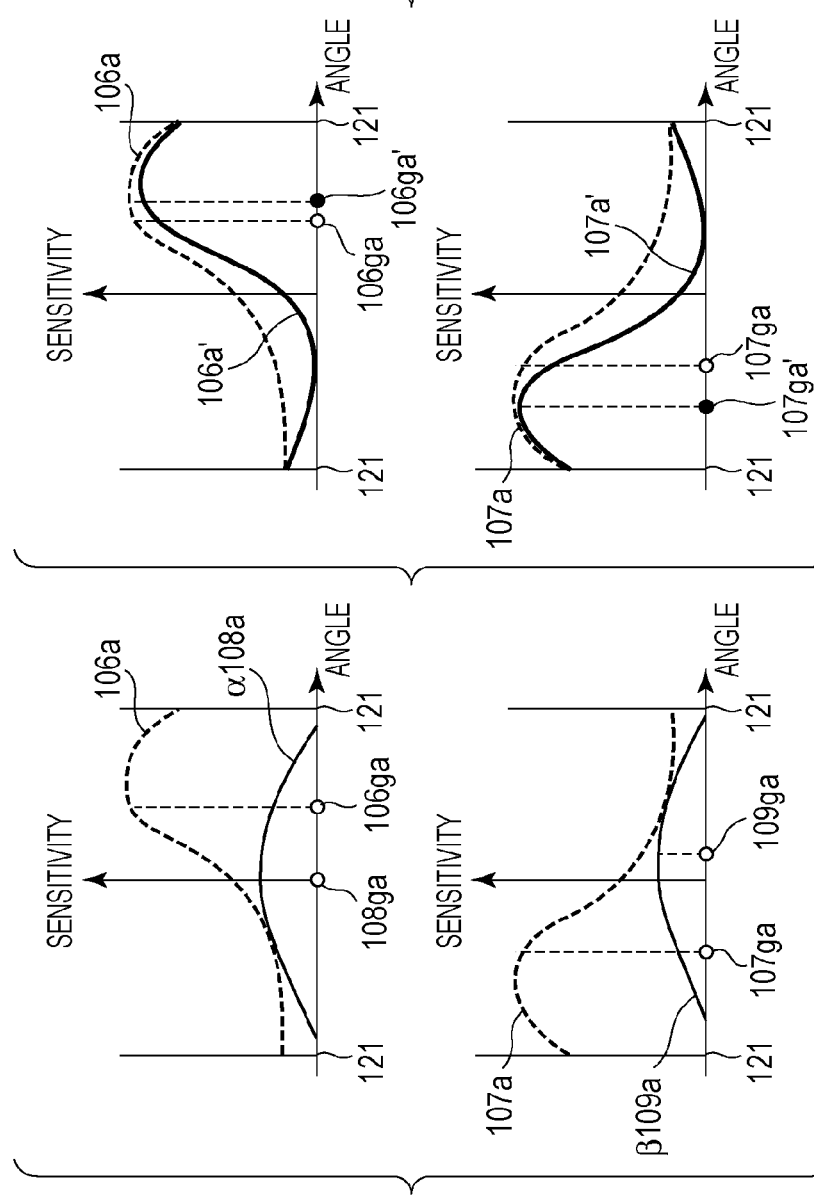
FIG. 4A is a graph showing the angle characteristics of light receiving portions.
FIG. 4B is a graph showing the angle characteristics of imaginary light receiving portions.
FIG. 4C is a diagram illustrating pupil divided regions and the centers of gravity of the pupils.

FIGS. 4A and 4B are graphs showing the angle characteristics of the light receiving portions 106 to 109 and the angle characteristics 106a' and 107a' of imaginary light receiving portions 106a' and 107a' corresponding to the corrected signal $CS_{106}$ (first corrected signal) and the corrected signal $CS_{107}$ (second corrected signal). FIG. 4C is a diagram illustrating the pupil divided regions 106d, 106d', 107d, and 107d' and the centers of gravity of the pupils, 106gp, 106gp', 107gp, and 107gp'.

As shown in FIG. 4A, the center-of-gravity angle 108ga is smaller than the center-of-gravity angle 106ga. Thus, the angle characteristic 106a' of the imaginary light receiving portion 106' corresponding to the corrected signal $CS_{106}$ is such that the sensitivity particularly at a small angle is lower than that of the angle characteristic 106a, as shown in FIG. 4B.

Thus, the center of the gravity angle 106ga' of the angle characteristic 106a' is larger to the + side than the center-of-gravity angle 106ga. As shown in FIG. 4C, the pupil divided region 106d' corresponding to the corrected signal $CS_{106}$ is eccentric to the +x direction from the pupil divided region 106d.

Also for the corrected signal $CS_{107}$, the center of the gravity angle 107ga' of the angle characteristic 107a' is larger to the − side than the center-of-gravity angle 107ga, and the pupil divided region 107d' is eccentric to the −x direction from the pupil divided region 107d.

The distance between the pupil divided regions 106d' and 107d' is lager than the distance between the pupil divided regions 106d and 107d before correction.

The distance 123 between the centers of gravity of the pupils 106gp' and 107gp' corresponding to the base length is larger than the base length 122 before correction. The gap length between the corrected signals $CS_{106}$ and $CS_{107}$ increases from that before correction, which allows the gap length to be obtained with high accuracy, thus allowing high-accuracy ranging. The distance measuring apparatus 100 of an embodiment of the present invention allows high-accuracy ranging of a low-luminance subject by using correcting signals with a high S/N ratio.

In the above-described signal correction process, if the correcting signals have noise (random noise), the corrected signals $CS_{106}$ and $CS_{107}$ are also given noise in a predetermined proportion in Exp. 3 or 5.

Insufficient S/N ratios of the corrected signals cause insufficient measurement accuracy of the image gap length.

This offsets the improving effect due to the image-gap-length increasing effect described above, thus reducing the ranging accuracy improving effect.

In particular, an extremely low-luminance subject causes much noise in the ranging signal $S_{106}$ (first electrical signal) and the ranging signal $S_{107}$ (second electrical signal).

Using a signal having a lower S/N ratio than that of a ranging signal as a correcting signal significantly increases an image-gap-length determination error, thus extremely reducing the improving effect of the signal correction process.

Thus, a correcting signal having a high S/N ratio or an S/N ratio higher than that of a ranging signal may be used.

In the distance measuring apparatus 100 of an embodiment of the present invention, the configurations of the signal acquisition units and the distance calculation unit 111 are not limited thereto.

The two light receiving portions 108 and 109 are provided as correcting signal acquisition units; alternatively, only the light receiving portion 108 may be provided, and signals acquired by the light receiving portion 108 may be used both as the correcting signals $S_{108}$ and $S_{109}$.

An example configuration in which a pupil is divided in the x-direction has been shown; alternatively, the pupil may be divided in the y-direction or in a slanting direction, and light receiving portions having pupil divided regions may be disposed in such a direction to perform ranging. This configuration allows ranging of a subject having different contrasts in such a direction.

An example in which the distance calculation unit 111 generates a pair of corrected signals $CS_{106}$ and $CS_{107}$ is shown above; alternatively, a corrected signal of one of the ranging signals $S_{106}$ and $S_{107}$ may be generated, and the corrected signal and the other ranging signal may be used to calculate the distance. This configuration can also provide the above advantages, thus allowing high-accuracy ranging.

Range of Correction Factor

In step 131 of FIG. 3, it is preferable that the correction factors α and β be within the ranges expressed by Exp. 6 and Exp. 8. In Exp. 6 and Exp. 8, $t_{106}$, $t_{107}$, $t_{108}$, and $t_{109}$ are the ratio of beams incident from locations on the exit pupil 120 to electrical signals converted by the individual light receiving portions 106 to 109.

Min( ) is a function for obtaining the minimum value in ( ), x and y are coordinates on the exit pupil 120, which are within the pupil region 108t of the light receiving portion 108 in Exp. 6, and within the pupil region 109t of the light receiving portion 109 in Exp. 8.

[Math. 2]

$$0 < \alpha \le \min\left(\frac{t_{106}(x, y)}{t_{108}(x, y)}\right) \quad \text{(Exp. 6)}$$

This can be simply expressed as Exp. 7.

$$0 < \alpha \le \min[T_1(p)/T_3(p)] \quad \text{(Exp. 7)}$$

where p is coordinates on the exit pupil 120, and $T_1$ and $T_3$ are the ratio of beams incident on the signal acquisition units from the coordinate positions on the exit pupil 120 to the first and third electrical signals $S_1$ and $S_3$ converted.

[Math. 3]

$$0 < \beta \le \min\left(\frac{t_{107}(x, y)}{t_{109}(x, y)}\right) \quad \text{(Exp. 8)}$$

This can be simply expressed as Exp. 9.

$$0 < \beta \le \min[T_2(p)/T_4(p)] \quad \text{(Exp. 9)}$$

where p is coordinates on the exit pupil 120, and $T_2$ and $T_4$ are the ratio of beams incident on the signal acquisition units from the coordinate positions on the exit pupil 120 to the second and fourth electrical signals $S_2$ and $S_4$ converted.

Setting the correction factors α and β in this manner causes the angle characteristics 106a' and 107a' to have no negative sensitivity.

The light receiving portions 106 to 109 acquire, as signals, values obtained by integrating the beams incident thereon at different angles depending on the sensitivity.

If part of the angle characteristics has negative sensitivity, a beam received at negative sensitivity shows a negative value, and the negative value is offset with the value of a beam received with positive sensitivity. Thus, the corrected signal lacks information on part of the beams.

This causes an error in the gap length determined from the corrected signal, thus causing a ranging error. Setting the correction factors α and β within the ranges expressed by Exp. 6 and Exp. 8 can decrease the error in the corrected signal to reduce a gap length detection error, thus allowing higher-accuracy ranging.

Disposition of Light Receiving Portions

In the distance measuring apparatus 100 of an embodiment of the present invention, the light receiving portions 106 to 109 that acquire the ranging signals and the correcting signals may be disposed next to each other on the imaging device 102.

Disposing the light receiving portions 106 to 109 at separate positions causes beams coming from different subjects to be incident thereon. The difference among the incident beams causes errors in corrected signals generated from signals acquired by the light receiving portions 106 to 109 in the signal correction process, thus causing an error in the result of ranging.

The light receiving portions 106 to 109 may be disposed close to each other, within three pixels, or within the same pixel.

Distance Calculation Using Corrected Base Length

Calculating the distance using a corrected base length W' in the distance calculation process in step 132 of FIG. 3 allows higher-accuracy ranging.

The corrected base length W' can be obtained by calculating the distance 123 between the centers of gravity of the pupils 106gp' and 107gp' of the imaginary light receiving portions 106d' and 107d' corresponding to the corrected signals $CS_{106}$ and $CS_{107}$ in FIG. 4C (corrected-base-length calculation process).

First, the centers of gravity angles 106ga' and 107ga' are obtained from the angle characteristics of the light receiving portions 106 and 107 and the correction factors α and β, and the centers of gravity of the pupils 106gp' and 107gp' are calculated from the centers of gravity angles 106ga' and 107ga' and the positional information on the exit pupil 120.

Next, the distance 123 between the centers of gravity of the pupils 106gp' and 107gp' on the exit pupil 120 corresponding to the corrected base length W' is calculated by using Exp. 10.

$$W' = |106gp' - 107gp'| \quad \text{(Exp. 10)}$$

The corrected base length 123 thus obtained and the gap length calculated in step 131 are used to obtain the defocusing amount by using Exp. 11, thereby calculating the distance to the subject.

In Exp. 11, ΔL is the defocusing amount, r is the gap length, L is the distance between the exit pupil 120 and the imaging device 102, and W' is the corrected base length 123.

[Math. 4]

$$\Delta L = \frac{rL}{W' - r} \quad \text{(Exp. 11)}$$

By calculating the defocusing amount from the gap length by using a higher-accuracy base length, the distance can be calculated with higher accuracy.

In the distance calculation process of step 132, the distance may be calculated by another method.

For example, a transformation coefficient for connecting the gap length to the defocusing amount may be calculated in advance, and the calculated gap length and the transformation coefficient may be used to calculate the defocusing amount.

This can omit a calculation for calculating the base length depending on image-capturing conditions and the position of the light receiving portions on the image plane, thus allowing high-speed ranging.

Adjustment of Correction Factor

In the signal correction process of step 131, adjusting the correction factors α and β depending on the positions of the light receiving portions 106 to 109 on the imaging device 102 and image-acquisition conditions (correction-factor adjusting process) allows hither-accuracy ranging.

For the image-forming optical system 101 like a zoom lens, the distance from the exit pupil 120 to the imaging device 102 changes depending on the state of zooming. Eclipse due to changes in the aperture of the image-forming optical system 101 or the angle of view, if present, will change the shape of the exit pupil 120.

These changes will change the angle ranges of beams incident on the light receiving portions 106 to 109, thus changing the numerical ranges of the correction factors α and β in Exp. 6 and Exp. 8. Selecting optimum correction factors α and β depending on the positions of the light receiving portions 106 to 109 on the imaging device 102 and the image-acquisition conditions allow higher-accuracy ranging under the conditions.

Image Modification Process

The distance calculation unit of the distance measuring apparatus 100 according to an embodiment of the present invention may further perform a signal modification process for modifying the image form of the corrected signals $CS_{106}$ and $CS_{108}$.

The corrected signals $CS_{106}$ and $CS_{107}$ can be described using the light distribution f of the subject and corrected line spread functions $L_{106}'$ and $L_{107}'$, as in Exp. 12 and Exp. 13, where x is a position on the imaging device 102 in the pupil dividing direction.

[Math. 5]

$$CS_{106}[x] = \sum_{-\infty}^{+\infty} f[x-i]L_{106}'[i] \quad \text{(Exp. 12)}$$

[Math. 6]

$$CS_{107}[x] = \sum_{-\infty}^{+\infty} f[x-i]L_{107}'[i] \quad \text{(Exp. 13)}$$

Let $L_{106}$, $L_{107}$, $L_{108}$, and $L_{109}$ be line spread functions determined depending on the point spread function of the image-forming optical system 101, the angle characteristics of the light receiving portions 106 to 109, and the shape and position of the exit pupil 120.

Corrected line spread functions $L_{106}'$ and $L_{107}'$ in Exp. 12 and Exp. 13 can be described as in Exp. 14 and Exp. 16, where α and β are the correction factors used in step 131.

$$L_{106}'[x] = L_{106}[x] - \alpha L_{108}[x] \quad \text{(Exp. 14)}$$

This can be further simplified to Exp. 15.

$$L_1' = L_1 - \alpha L_3 \quad \text{(Exp. 15)}$$

where $L_1'$ can be referred to as a first modification filter, and $L_1$ and $L_3$ can be referred to as line spread functions determined depending on the signal acquisition units for the first and third electrical signals $S_1$ and $S_3$ and the optical system 101.

$$L_{107}'[x] = L_{107}[x] - \beta L_{109}[x] \quad \text{(Exp. 16)}$$

This can be further simplified to Exp. 17.

$$L_2' = L_2 - \beta L_4 \quad \text{(Exp. 17)}$$

where $L_2'$ can be referred to as a second modification filter, and $L_2$ and $L_4$ can be referred to as line spread functions determined depending the signal acquisition units for the second and fourth electrical signals $S_2$ and $S_4$ and the optical system 101.

The line spread function L is determined depending on the position and shape of the exit pupil 120 and the angle characteristics of the light receiving portions 106 to 109. Eclipse due to the lens frame of the image-forming optical system 101, is possible, will make the line spread functions $L_{106}$ and $L_{107}$ differ from each other and the line spread functions $L_{108}$ and $L_{109}$ differ from each other.

The corrected line spread functions $L_{106}'$ and $L_{107}'$ differ from each other, and the image shapes of the corrected signals $CS_{106}'$ and $CS_{107}'$ differ from each other.

Figure 5:
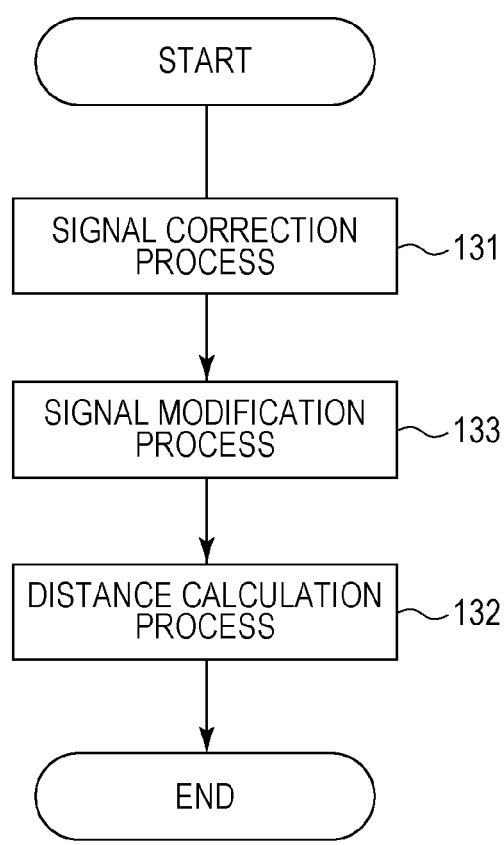
FIG. 5 is a flowchart for the distance measuring apparatus according to an embodiment of the present invention.

Next, a flowchart including the signal modification process will be shown in FIG. 5.

FIG. 5 is a flowchart similar to FIG. 3 but differs from FIG. 3 in that it has a signal modification processing step 133.

Step 133 is a signal modification process for modifying the image shapes of the corrected signals $CS_{106}$ and $CS_{107}$.

First, a temporary defocusing amount is calculated from the pair of signals $S_{106}$ and $S_{107}$ or the corrected signals $CS_{106}$ and $CS_{107}$ using a known unit.

Next, the corrected line spread functions $L_{106}'$ and $L_{107}'$ shown in Exp. 14 and Exp. 16 are created as image modification filters on the basis of the temporary defocusing amount and the known information about the angle characteristics of the individual light receiving portions 106 to 109 and the known information on the exit pupil 120.

The corrected signals $CS_{106}$ and $CS_{107}$ are subjected to convolution integral by the image modification filters $L_{107}'$ and $L_{106}'$ to create a modified signal $MS_{106}$ (first modified signal) and a modified signal $MS_{107}$ (second modified signal), respectively. The reference point for the convolution integral is set at the centers of weight of the image modification filters $L_{107}'$ and $L_{106}'$.

The image shapes of the modified signals $MS_{106}$ and $MS_{107}$ are expressed as Exp. 18 and Exp. 19.

[Math. 7]

$$MS_{106}[x] = \sum_{i=0}^{m} CS_{106}[x-i]L_{107}'[i] = \sum_{j=0}^{n}\sum_{i=0}^{m} f[x-i-j]L_{106}'[i]L_{107}'[j] \quad \text{(Exp. 18)}$$

[Math. 8]

$$MS_{107}[x] = \sum_{i=0}^{m} CS_{107}[x-i]L_{106}'[i] = \sum_{i=0}^{m}\sum_{j=0}^{n} f[x-j-i]L_{107}'[j]L_{106}'[i] \quad \text{(Exp. 19)}$$

As shown in Exp. 18 and Exp. 19, the image shapes of the modified signals $MS_{106}$ and $MS_{107}$ are determined depending on the corrected line spread functions $L_{106}'$ and $L_{107}'$ and are substantially the same.

In step 132, the defocusing amount and the distance to the subject are calculated using the modified signals $MS_{106}$ and $MS_{107}$ by a known unit.

The ranging calculation including the signal modification process according to an embodiment of the invention allows the image shapes of the corrected signals $CS_{106}$ and $CS_{107}$ to be modified, thus reducing gap-length calculation errors due to a difference in image shape. This can improve the gap length determination accuracy, allowing higher-accuracy ranging.

The image modification filters $L_{106}'$ and $L_{107}'$ are functions that change depending on the defocusing amount.

An image modification filter may be created again on the basis of the defocusing amount obtained in step 132, and the image modification filter may be used to create a modified image to find a defocusing amount.

Creating the image modification filter on the basis of a defocusing amount closer to a correct value reduces the shape error of the image modification filter. This reduces the shape error of the modified signals $MS_{106}$ and $MS_{107}$, which improves the accuracy of calculation of the gap length and the defocusing amount, thus improving the ranging accuracy.

The signal modification process is not limited to that of this embodiment. For example, the signal modification process may be performed by deriving inverse functions $L_{106}'-1$ and $L_{107}'-1$ of the corrected line spread functions $L_{107}'$ and $L_{106}'$ in Exp. 14 and Exp. 16 and by performing convolution integral on the corrected signals $CS_{106}$ and $CS_{107}$ by the inverse functions $L_{106}'-1$ and $L_{107}'-1$.

This description shows a process example in which the signal modification process uses one-dimensional line spread functions in the pupil dividing direction (x-direction); alternatively, a two-dimensional point spread function (x-y direction) may be used for the modification. This allows a modification process considering a direction (y-direction) perpendicular to the pupil dividing direction caused by defocusing, thus allowing higher-accuracy modified signals to be created. Alternatively, another signal modification process may be performed on the basis of the information on the exit pupil 120 and the characteristics of the signal acquisition units.

Image-Acquisition System, AF, and Distance Image

The result of ranging of the distance measuring apparatus 100 of an embodiment of the present invention can be used, for example, to detect the focus of the image-forming optical system 101. The distance measuring apparatus 100 of an embodiment of the present invention allows the distance to the subject to be measured at high speed and with high accuracy, thus allowing the gap length between the subject and the focal position of the image-forming optical system 101 to be determined. Controlling the focal position of the image-forming optical system 101 allows the focal position to coincide with the subject at high speed and with high accuracy.

Alternatively, disposing such light receiving portions all over the imaging device 102 and calculating the distance using signals acquired for a plurality of regions on the imaging device 102 allows a distance image to be acquired.

The distance measuring apparatus 100 of an embodiment of the present invention can constitute image acquisition units, such as a digital still camera and a digital video camera, and the focus of the optical system 101 can be detected on the basis of the distance measurement result of the distance measuring apparatus 100.

Other Configurations

Specific examples of the imaging device of the distance measuring apparatus 100 of an embodiment of the present invention include solid-state imaging devices, such as a CMOS sensor (complementary metal-oxide semiconductor sensor) and a charge-coupled device (CCD) sensor.

The calculation unit 111 of the distance measuring apparatus 100 can be constituted by an integrated circuit in which semiconductor devices are integrated; for example, an integrated circuit (IC), a large scale integrated circuit (LSI), a system LSI, a microprocessing unit (MPU), and a central processing unit (CPU).

The present invention further includes a program in addition to the distance measuring apparatus 100.

A program according to an embodiment of the present invention causes a computer for calculating, in a distance measuring apparatus including an optical system forming an image of a subject and an imaging device acquiring an electrical signal from a beam that has passed through an exit pupil of the optical system, a distance to a subject by using a first electrical signal mainly based on a beam that has passed through a first region off the center of the exit pupil in a predetermined direction, a second electrical signal mainly based on a beam that has passed through a second region off the center of the exit pupil in a direction opposite to the predetermined direction, and a third electrical signal different from the second electrical signal, the third electrical signal being based on a beam that has passed through a region eccentric from the first region in the direction opposite to the predetermined direction, to execute predetermined processes.

Here, the distance measuring apparatus 100 shown in FIG. 1C includes the optical system 101, the imaging device 102, the calculation unit 111, and the recording unit 112.

The calculation unit 111 constituted by a microprocessing unit, a central processing unit, or the like can be regarded as a computer.

A program according to an embodiment of the present invention causes the computer corresponding to the calculation unit to execute a signal correction process for generating a first corrected signal by subtracting the third electrical signal from the first electrical signal in a predetermined proportion and a distance calculation process for calculating the distance by using the first corrected signal.

The program according to an embodiment of the present invention allows a distance measuring apparatus or an image-acquisition unit to perform high-accuracy ranging by being installed in a computer of a distance measuring apparatus or an image-acquisition unit, such as a camera, including a predetermined image-forming optical system, a predetermined imaging device, and the computer.

The program of an embodiment of the present invention can be distributed via the Internet, in addition to a recording medium.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), microprocessing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention will be described in detail below with reference to specific examples.

First Embodiment

Figure 6:
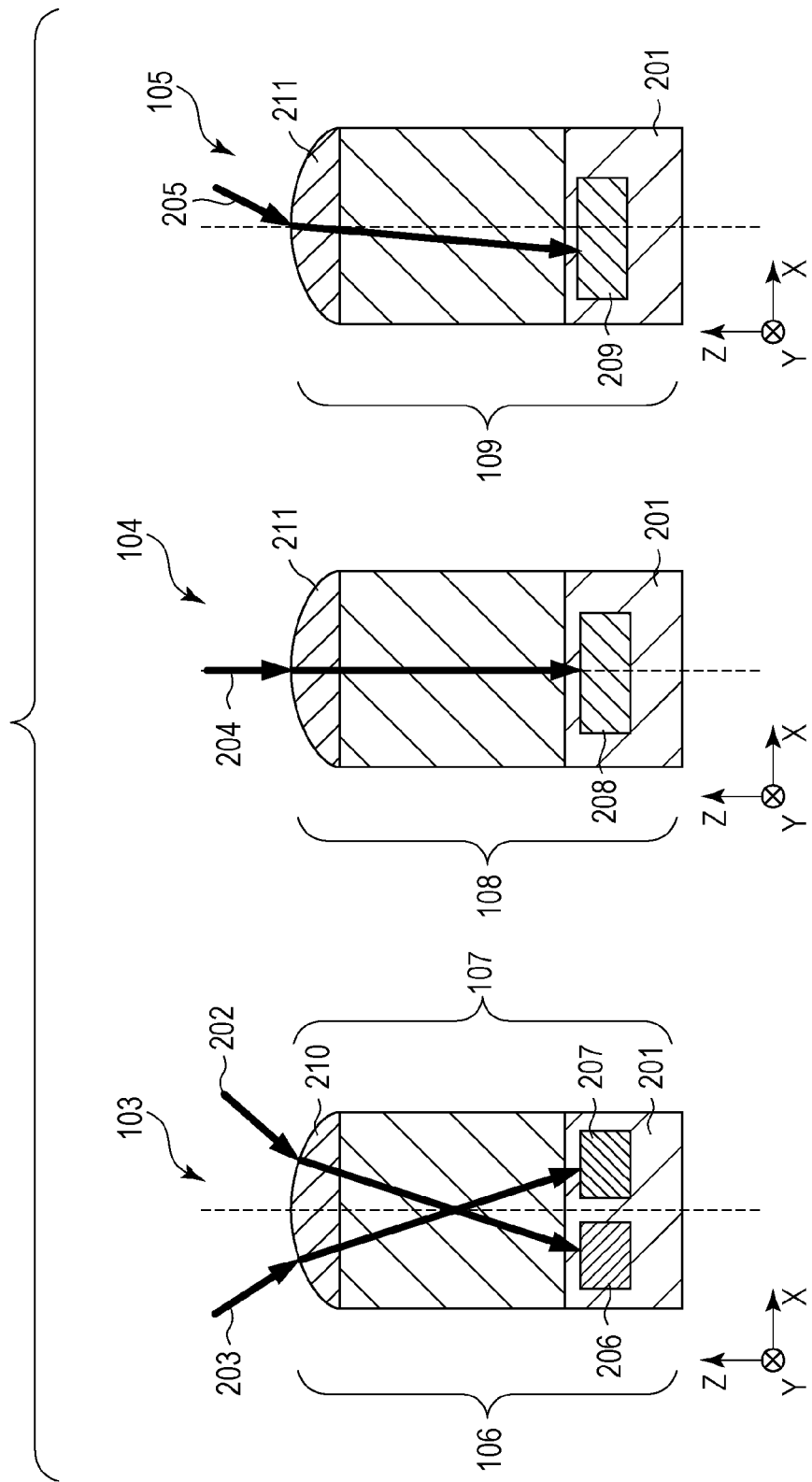
FIG. 6 is a cross-sectional view showing, in outline, an imaging device of a distance measuring apparatus according to a first embodiment of the present invention.

Example configurations of signal acquisition units of the distance measuring apparatus 100 according to a first embodiment of the present invention will be shown in FIG. 6.

In FIG. 6, the light receiving portions 106 and 107 are configured such that a microlens 210 is provided in the pixel 103 and photoelectric conversion sections 206 and 207 are provided in a substrate 201 formed of a semiconductor or the like.

The light receiving portions 108 and 109 are configured such that a microlens 211 is provided in each of the pixels 104 and 105, and photoelectric conversion sections 208 and 209 are provided in the semiconductor substrate 201, respectively. The pixels 103 to 105 each include a reading unit (not shown) that outputs electrical charge, as electrical signals, accumulated in the individual light receiving portions 106 to 109 to the distance calculation unit 111.

Beams that have passed through the exit pupil 120 and are incident on the light receiving portions 106 to 109 pass through the microlens 210 or 211 and are guided to the photoelectric conversion sections 206 to 209, respectively.

In the light receiving portions 106 and 107, beams 202 and 203 that have passed through the pupil divided regions 106d and 107d having different exit pupils 120 (FIG. 2B) are particularly efficiently received by the photoelectric conversion section 206 and the photoelectric conversion section 207, respectively.

This configuration can easily achieve the light receiving portions 106 and 107 having the high-sensitivity pupil divided regions 106d and 107d (FIG. 2B) that are eccentric in different directions on the exit pupil 120 (FIG. 1A).

The light receiving portions 108 and 109 efficiently receive beams 204 and 205 that have passed through the pupil divided regions 108d and 109d in the vicinity of the center of the exit pupil 120 (FIG. 2B) with photoelectric conversion sections 208 and 209, respectively.

This configuration can easily achieve the light receiving portions 108 and 109 that mainly receive beams coming from the pupil divided regions 108d and 109d eccentric from the pupil divided regions 106d and 107d in the opposite direction, respectively. This configuration can easily achieve the light receiving portions 108 and 109 having higher sensitivity than the light receiving portions 106 and 107. Adjusting the curvatures of the microlens 210 and 211 and the distances to the photoelectric conversion sections 206 to 209 allows control of the angle characteristics and the pupil divided regions 106d to 109d of the light receiving portions 106 to 109. This configuration allows ranging signals to be obtained from the light receiving portions 106 and 107 and correcting signals to be obtained from the light receiving portions 108 and 109, and the distance to be calculated by the distance calculation unit 111 described above.

In the distance measuring apparatus 100 of an embodiment of the present invention, the configuration in which a plurality of photoelectric conversion sections are disposed in a pixel, like the pixel 103, allows beams to be received with high sensitivity by the photoelectric conversion sections 206 and 207, thus allowing high-quality image signals to be acquired. The signals acquired by the light receiving portions 108 and 109 can be used as image signals for the pixels 104 and 105, respectively.

Figure 7A:
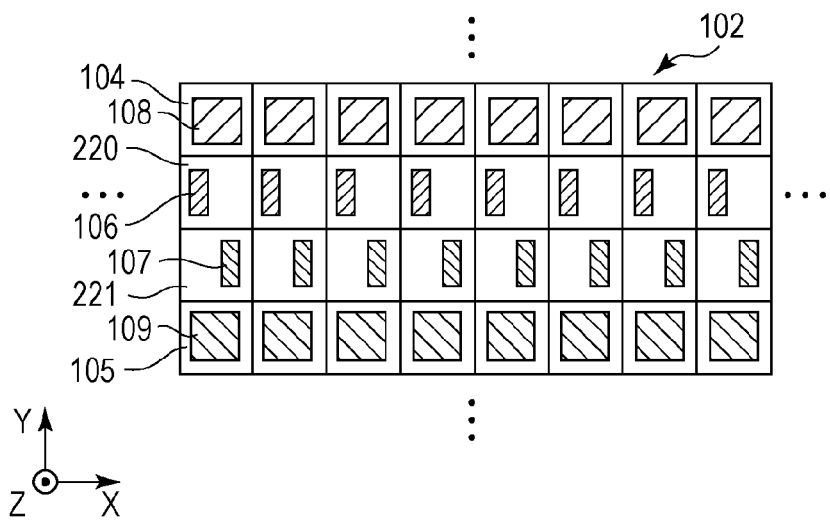
FIG. 7A is a diagram illustrating an example of the imaging device of the distance measuring apparatus according to the first embodiment of the present invention.
Figure 7B:
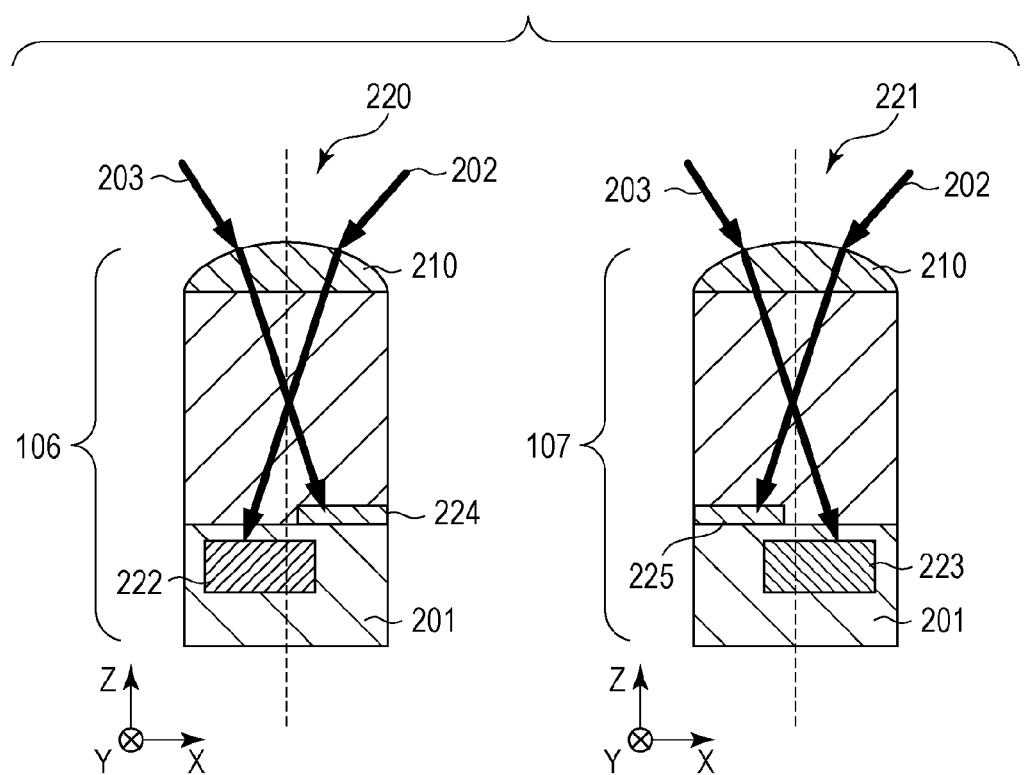
FIG. 7B is a cross-sectional view showing, in outline, the imaging device of the distance measuring apparatus according to the first embodiment of the present invention.

Other example configurations of the light receiving portions 106 to 109 constituting the distance measuring apparatus 100 of the first embodiment will be shown in FIGS. 7A and 7B.

Referring to FIG. 7A, the light receiving portions 106 and 107 are disposed in different pixels 220 and 221, respectively.

The light receiving portions 106 and 107 each include the microlens 210, a photoelectric conversion section 222 or 223, and a light shield 224 or 225. The light receiving portions 108 and 109 have the same configuration as that in FIG. 6. The pixels 222 and 223 each include a reading unit (not shown) that outputs electrical charge, as electrical signals, accumulated in the light receiving portions 106 and 107 to the distance calculation unit 111.

The photoelectric conversion sections 222 and 223 of the light receiving portions 106 and 107 receive beams that have passed through the exit pupil 120. The light receiving portion 106 blocks the beam 203 and mainly receives the beam 202. The light receiving portion 107 blocks the beam 202 and mainly receives the beam 203.

This configuration allows the ranging signals signal $S_{106}$ and $S_{107}$ to be acquired. The correcting signals $S_{108}$ and $S_{109}$ can be acquired by the light receiving portions 108 and 109, respectively, as in the above.

Using these signals allows high-accuracy ranging with the above-described method. This configuration can increase the distance between the photoelectric conversion sections 222 and 223, thus making it easy to manufacture the light receiving portions 106 and 107 of an imaging device having small pixels.

Waveguide Type

The pixels 103 to 105 constituting the distance measuring apparatus 100 may each include a waveguide shown in FIG. 8.

The pixels 103 to 105 each include a waveguide composed of a core 230 and a clad 231 at the light incident side (+z side) of the substrate 201. The pixel 103 includes the photoelectric conversion sections 206 and 207. The pixels 104 and 105 include the photoelectric conversion sections 208 and 209, respectively. The pixels 103 to 105 each include a reading unit (not shown) that outputs electrical charge, as electrical signals, accumulated in the light receiving portions 106 to 109 to the distance calculation unit 111.

The core 230 and the clad 231 are formed of a transparent material having an imaging wavelength range. The core 230 is formed of a material having a higher refractive index than that of the clad 231.

This allows light to be enclosed and propagated in the core 230. The beams that have passed through the exit pupil 120 and are incident on the individual pixels 103 to 105 propagate through the waveguides to the photoelectric conversion sections 206 to 209.

In the pixel 103, the beam 202 is particularly efficiently received by the photoelectric conversion section 206, and the beam 203 is particularly efficiently received by the photoelectric conversion section 207. In the pixels 104 and 105, the beams 204 and 205 are efficiently received by the photoelectric conversion sections 208 and 209, respectively.

This configuration allows incident light to be efficiently received also with an imaging device having small pixel size.

Alternatively, a back-illuminated type in which a waveguide composed of a core and a clad is provided in the substrate 104 is possible.

This configuration allows light incident from the back of the substrate 104 (light propagating in the +z direction) to be detected. Wires and so on can be disposed on the front of the substrate 104, thus preventing interference with propagation of incident light due to the wires and so on. Furthermore, this configuration reduces spatial restriction due to the wires and so on, thus allowing incident light to be efficiently guided to the photoelectric conversion sections 206 to 209.

Second Embodiment

Figure 9A:
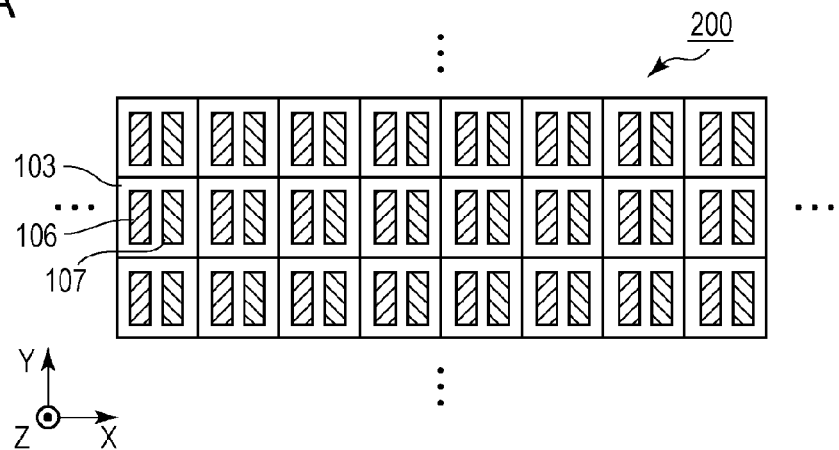
FIG. 9A is a diagram illustrating an example of an imaging device of a distance measuring apparatus according to a second embodiment of the present invention.
Figure 9B:
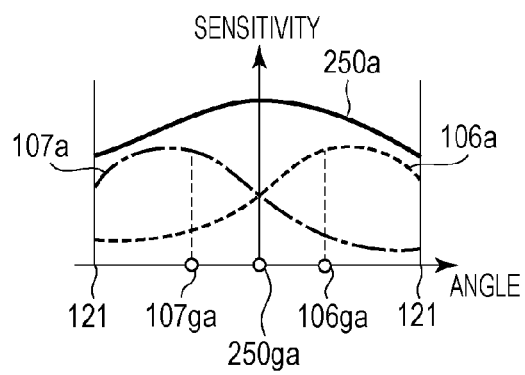
FIG. 9B is a graph showing the angle characteristics of the light receiving portions.
Figure 9C:
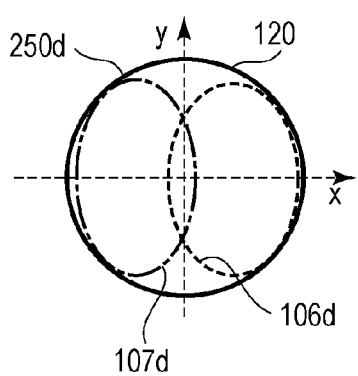
FIG. 9C is a diagram showing pupil divided regions on the exit pupil.

An example configuration of a signal acquisition unit of the distance measuring apparatus 100 according to a second embodiment will be shown in FIGS. 9A to 9C.

In FIG. 9A, an imaging device 200 includes the pixels 103 each including the light receiving portion 106 and the light receiving portion 107.

The light receiving portions 106 and 107 have the same configuration as shown in FIG. 6.

The pixels 103 each include a reading unit (not shown) that converts electrical charge accumulated in the light receiving portions 106 and 107 to electrical signals and outputs the signals to the distance calculation unit 111 (FIG. 1C).

The second embodiment uses the electrical signals acquired by the light receiving portions 106 and 107 as the ranging signals $S_{106}$ and $S_{107}$.

FIGS. 9B and 9C are diagrams showing the angle characteristics of the light receiving portions 106 and 107 and the pupil divided regions 106d and 107d on the exit pupil 120.

The light receiving portions 106 and 107 generate a signal (in the second embodiment, referred to as an added signal $S_{250}$) based on a beams that has mainly passed through a region 250d including the pupil divided regions 106d and 107d. For example, the added signal $S_{250}$ is generated by adding the ranging signals $S_{106}$ and $S_{107}$ acquired by the light receiving portions 106 and 107, respectively. Alternatively, the added signal $S_{250}$ is generated by the reading unit on the basis of the amount of electrical charge accumulated in the light receiving portions 106 and 107. The added signal $S_{250}$ is used as a correcting signal of the ranging signal $S_{106}$ or $S_{107}$.

Ranging by the above method using these signals allows a low-luminance subject to be measured with high accuracy.

The pupil region 250d has its center of gravity 250ga between the centers of gravity 106ga and 107ga of the pupil divided regions 106d and 107d.

The pupil region 250d is a region eccentric to the direction opposite to the eccentric direction of the pupil region 106d in which the added signal $S_{250}$ can be used as a correcting signal for the ranging signal $S_{106}$. The pupil region 250d is also a region eccentric to the direction opposite to the eccentric direction of the pupil region 107d, in which the added signal $S_{250}$ can be used as a correcting signal for the ranging signal $S_{107}$.

The added signal $S_{205}$ includes the signal components of the ranging signals $S_{106}$ and $S_{107}$, that is, twice the ranging signals $S_{106}$ and $S_{107}$. The noise component thereof is smaller than the twice, because the random noises of the ranging signals $S_{106}$ and $S_{107}$ are averaged. In other words, the S/N ratio of the added signal $S_{250}$ is higher than the S/N ratios of the individual signals $S_{106}$ and $S_{107}$.

Using such a correcting signal for the signal correction process can suppress a drop in the S/N ratios of the corrected signals, thus allowing high-accuracy ranging of a low-luminance subject, as in the above.

Generating the signals from the electrical signals $S_{106}$ and $S_{107}$ acquired by the light receiving portions 106 and 107 eliminates the need for a light receiving portion for acquiring a correcting signal, thus simplifying the configuration.

Furthermore, this configuration allows the ranging signals $S_{106}$ and $S_{107}$ and the correcting signal $S_{250}$ to be acquired at the same pixel, and errors in the corrected signal $CS_{106}$ and $CS_{107}$ to be reduced for the above reason, thus allowing higher-accuracy ranging.

Disposing such pixels 103 all over the imaging device 102 allows a high-resolution and high-accuracy distance image and a high-quality image to be acquired at the same time.

In the distance measuring apparatus 200 of the second embodiment of the present invention, the configuration of the light receiving portions 106 and 107 is not limited thereto.

The pixels 220 and 221 shown in FIGS. 7A and 7B or the pixel 103 shown in FIG. 8 may be disposed all over the imaging device 102, and the electrical signals acquired by the light receiving portions 106 and 107 included in the pixels 220 and 221 or the pixels 103 to 105 may be used as ranging signals and correcting signals. This can provide the same advantages as those described above.

Third Embodiment

Figure 10:
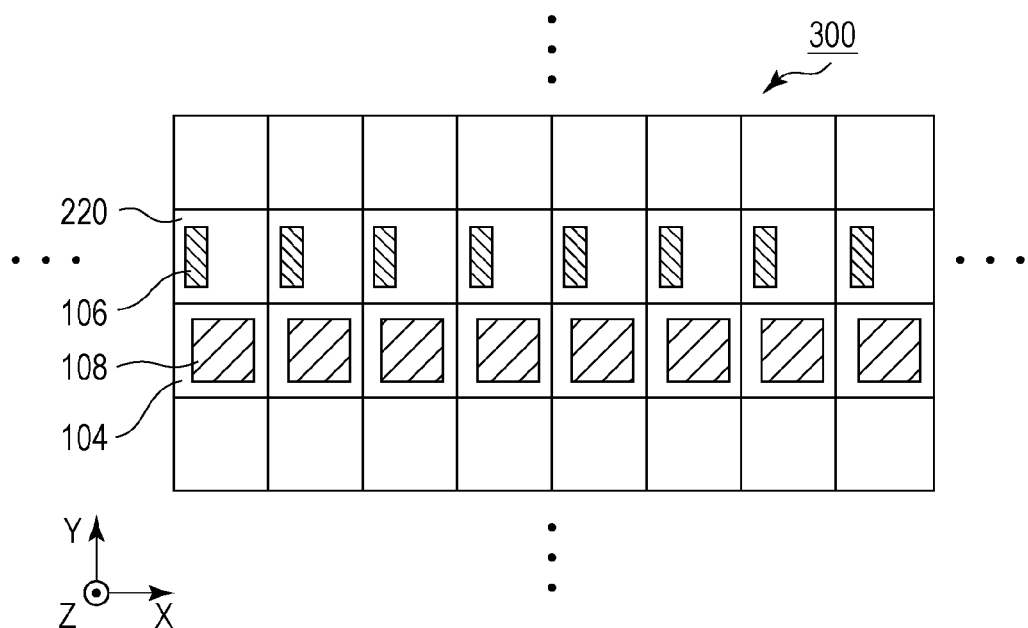
FIG. 10 is a diagram illustrating an example of an imaging device of a distance measuring apparatus according to a third embodiment of the present invention.

Example configurations of signal acquisition units of the distance measuring apparatus 100 according to a third embodiment will be shown in FIG. 10.

An imaging device 300 shown in FIG. 10 includes pixels 220 and the pixels 104. The pixels 220 each include the light receiving portion 106, and the pixels 104 each include the light receiving portion 108.

The angle characteristics and the pupil divided regions 106d and 108d of the light receiving portions 106 and 108 are the same as above. The pixels 220 and 104 each include a reading unit (not shown) that outputs electrical charge, as electrical signals, accumulated in the light receiving portions 106 and 108 to the distance calculation unit 111.

The third embodiment uses a signal acquired by the light receiving portion 106 (first light receiving portion) as the ranging signal $S_{106}$ (first electrical signal) and a signal obtained by subtracting the ranging signal $S_{106}$ from a signal acquired by the light receiving portion 108 as the ranging signal $S_{107}$ (second electrical signal). The third embodiment uses the signal acquired by the light receiving portion 108 as a correcting signal for the ranging signal $S_{106}$ or $S_{107}$. Thus, the light receiving portion 108 can be referred to as a fifth light receiving portion.

Ranging by the above method using these signals allows a low-luminance subject to be measured with high accuracy. The light receiving portion 108 is configured to receive beams more than the light receiving portion 106 to have high sensitivity, as described above, thus allowing correcting signals having a high S/N ratio to be acquired.

Such a configuration can reduce the number of light receiving portions for acquiring ranging signals and correcting signals, thus simplifying the configuration of the imaging device 102. In particular, using the light receiving portion 108 having higher sensitivity than the light receiving portion 107 can improve the quality of the signals, thus enhancing the image quality, as compared with the configuration in FIGS. 7A and 7B.

REFERENCE SIGNS LIST 100 distance measuring apparatus
101 optical system
102 imaging device
111 calculation unit
120 exit pupil While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-248624, filed Nov. 12, 2012, which is hereby incorporated by reference herein in its entirety.

The invention claimed is:

1. A distance measuring apparatus comprising:
an optical system forming an image of a subject;
an imaging device acquiring an electrical signal from a beam that has passed through an exit pupil of the optical system; and
a calculation unit calculating a distance to the subject on the basis of the electrical signal,
wherein the imaging device includes a signal acquisition unit acquiring
a first electrical signal mainly based on a beam that has passed through a first region off the center of the exit pupil in a predetermined direction;
a second electrical signal mainly based on a beam that has passed through a second region off the center of the exit pupil in a direction opposite to the predetermined direction; and
a third electrical signal different from the second electrical signal on the basis of a beam that has passed through a third region off the first region in the direction opposite to the predetermined direction, and
wherein the calculation unit performs a signal correction process for generating a first corrected signal by subtracting the third electrical signal from the first electrical signal in a predetermined proportion and a distance calculation process for calculating the distance by using the first corrected signal in a phase-difference detection method.

2. The distance measuring apparatus according to claim 1, wherein, in the signal correction process, the first corrected signal is generated on the basis of Exp. 3, $$S_1' = S_1 - \alpha S_3 \quad \text{(Exp. 3)}$$

where $S_1'$ is the first corrected signal, $S_1$ is the first electrical signal, $S_3$ is the third electrical signal, and $\alpha$ is a positive value that causes S1' to have no negative value.

3. The distance measuring apparatus according to claim 1, wherein
the signal acquisition unit further acquires a fourth electrical signal different from the first electrical signal mainly on the basis of a beam that has passed through a forth region off the second region to the predetermined direction;
in the signal correction process, a second corrected signal is further generated by subtracting the fourth electrical signal from the second electrical signal in a predetermined proportion; and
in the distance calculation process, the distance is calculated using the first corrected signal and the second corrected signal.

4. The distance measuring apparatus according to claim 3, wherein, in the signal correction process, the second corrected signal is generated on the basis of Exp. 5, $$S_2' = S_2 - \beta S_4 \quad \text{(Exp. 5)}$$

where $S_2'$ is the second corrected signal, $S_2$ is the second electrical signal, $S_4$ is the fourth electrical signal, and $\beta$ is a positive value that causes S2' to have no negative value.

5. The distance measuring apparatus according to claim 3, wherein
the signal acquisition unit generates electric signals in accordance with a quantity of a beam;
the third electrical signal is a signal having a higher S/N ratio than the S/N ratio of the second electrical signal; and
the fourth electrical signal is a signal having a higher S/N ratio than the S/N ratio of the first electrical signal.

6. The distance measuring apparatus according to claim 3, wherein the signal acquisition unit includes first, second, third, and fourth light receiving portions that acquires the first, second, third, and fourth electrical signals, respectively.

7. The distance measuring apparatus according to claim 1, wherein the third electrical signal is an electrical signal different from the second electrical signal, the third electrical signal being acquired mainly on the basis of, among beams that have passed through a pupil region through which a beam corresponding to the first electrical signal passes, a beam that has passed through the third region off the first region in the direction opposite to the predetermined direction.

8. The distance measuring apparatus according to claim 3, wherein the fourth electrical signal is an electrical signal different from the first electrical signal, the fourth electrical signal being acquired mainly on the basis of, among beams that have passed through a pupil region through which a beam corresponding to the second electrical signal passes, a beam that has passed through the forth region off the second region to the predetermined direction.

9. The distance measuring apparatus according to claim 3, wherein
the signal acquisition unit includes first and second light receiving portions acquiring the first and second electrical signals, respectively; and
the third and fourth electrical signals are generated by the first and second light receiving portions mainly on the basis of beams that have passed through the first region and the second region, respectively.

10. The distance measuring apparatus according to claim 3, wherein
the signal acquisition unit includes a first light receiving portion and a fifth light receiving portion;
the third and fourth electrical signals are acquired by the fifth light receiving portion;
the first electrical signal is acquired by the first light receiving portion; and
the second electrical signal is a signal generated by subtracting the first electrical signal from the electrical signal acquired by the fifth light receiving portion.

11. The distance measuring apparatus according to claim 6, wherein
the imaging device includes a plurality of pixels having the light receiving portions; and
the light receiving portions are disposed in three adjacent pixels.

12. The distance measuring apparatus according to claim 3, wherein
the calculation unit further performs a corrected-base-length calculation process for calculating a corrected base length on the basis of regions on the exit pupil through which beams corresponding to the first and second corrected signals pass; and
in the distance calculation process, the distance is calculated using the correct base length and the corrected signal.

13. The distance measuring apparatus according to claim 4, wherein the signal correction process includes a correction-factor adjusting process for adjusting the correction factors depending on the shape of the exit pupil, the distance between the exit pupil and the imaging device, or positions on the imaging device.

14. The distance measuring apparatus according to claim 4, wherein
the calculation unit further performs a signal modification process for generating first and second modification filters expressed by Exp. 15 and Exp. 17 and performing convolution integral of the first corrected signal and the second modification filter and convolution integral of the second corrected signal and the first modification filter to generate a first modified signal and a second modified signal, respectively; and
the distance calculation process is a process for calculating the distance by using the first modified signal and the second modified signal instead of the first corrected signal and the second corrected signal, $$L_1' = L_1 - \alpha L_3 \quad \text{(Exp. 15)}$$

$$L_2' = L_2 - \beta L_4 \quad \text{(Exp. 17)}$$

where $L_1'$ and $L_2'$ are the first and second modification filters, $L_1$, $L_2$, $L_3$, and $L_4$ are line spread functions determined depending on the signal acquisition units for the first, second, third, and fourth signals and the optical system, and $\alpha$ and $\beta$ are the correction factors.

15. An image acquisition unit comprising the distance measuring apparatus according to claim 1.

16. The image acquisition unit according to claim 15, wherein the distance measuring apparatus detects the focus of the optical system on the basis of the result of distance measurement of the distance measuring apparatus.

17. The image acquisition unit according to claim 15, wherein the image acquisition unit acquires a distance image by using the distance measuring apparatus.

18. A method for measuring a distance, comprising the steps of:

acquiring a first electrical signal mainly based on a beam that has passed through a first region off the center of an exit pupil of an optical system in a predetermined direction;
acquiring a second electrical signal mainly based on a beam that has passed through a second region off the center of the exit pupil in a direction opposite to the predetermined direction;
acquiring a third electrical signal different from the second electrical signal on the basis of a beam that has passed through a third region off the first region in the direction opposite to the predetermined direction;
generating a first corrected signal by subtracting the third electrical signal from the first electrical signal in a predetermined proportion; and
calculating the distance by using the first corrected signal in a phase-difference detection method.

19. A non-transitory storage medium recording a program for causing a computer for calculating, in a distance measuring apparatus including an optical system forming an image of a subject and an imaging device acquiring an electrical signal from a beam that has passed through an exit pupil of the optical system, a distance to a subject by using a first electrical signal mainly based on a beam that has passed through a first region off the center of the exit pupil in a predetermined direction, a second electrical signal mainly based on a beam that has passed through a second region off the center of the exit pupil in a direction opposite to the predetermined direction, and a third electrical signal different from the second electrical signal, the third electrical signal being based on a beam that has passed through a third region off the first region in the direction opposite to the predetermined direction, to execute a signal correction process for generating a first corrected signal by subtracting the third electrical signal from the first electrical signal in a predetermined proportion and a distance calculation process for calculating the distance by using the first corrected signal in a phase-difference detection method.

* * * * *